United States Patent Office 3,817,740
Patented June 18, 1974

3,817,740
METHOD FOR PLANT GROWTH REGULATION
Tomas L. Fridinger, Edward L. Mutsch, and David R. Pauly, Stillwater, Minn., assignors to Minnesota Mining and Manufacturing Company, St. Paul, Minn.
No Drawing. Continuation-in-part of application Ser. No. 90,074, Nov. 16, 1970, now Patent No. 3,709,936. This application Nov. 17, 1971, Ser. No. 199,717
Int. Cl. A01n 9/20
U.S. Cl. 71—76                        7 Claims

ABSTRACT OF THE DISCLOSURE

A method for regulating the growth of plants by applying to growing plants an effective amount of alkylsulfonyl-, haloalkylsulfonyl-, aralkylsulfonyl or arylsulfonylhydrazones of 2,6-dihalobenzaldehydes is described.

BACKGROUND OF THE INVENTION

This application is a continuation-in-part of our prior copending application Ser. No. 90,074, filed Nov. 16, 1970, now U.S. Pat. 3,709,936.

This invention relates to a method for regulating the growth of higher plants by applying to them compounds which are substituted hydrazones of 2,6-dihalobenzaldehydes, and more specifically hydrazones substituted by alkylsulfonyl, haloalkylsulfonyl, aralkylsulfonyl or arylsulfonyl radicals. The method of the invention includes use of the specified plant growth regulator compounds with various suitable diluents or adjuvants, both inert and active.

Methods for regulating plant growth, including complete inhibition thereof owing to general or specific phytotoxicity, are described in a number of patents, including U.S. Pats. 3,234,255; 3,344,153; 3,326,663; 3,165,549; 3,383,195 and 3,491,145, and French Pat. 1,532,014 and others.

Plant growth regulating utility of practical value is relatively uncommon, although widely sought. In some cases chemical compounds may be plant growth regulators at particular concentrations and may be very phytotoxic, that is herbicidal, at higher concentrations. An example of this is 2,4-dichlorophenoxyacetic acid. In fact, the term "plant growth regulator," as sometimes used, includes herbicidal properties, although it is not used herein in that sense. Plant growth regulators may stimulate or retard growth of the plant or may affect the growth of one particular part of the plant without affecting other parts of the plant. In some cases, plant growth regulators may be found which direct the energy of the plant to a particular aspect of its development which is most desirable, that is they may increase the yield of the edible portion of the plant. This may occur by a variety of mechanisms, for example increased flowering, increased bud set, enlargement of the edible portion and the like. Such effects are particularly advantageous.

The methods for application of agricultural chemicals in general, and plant growth regulators in particular, utilize the distribution of a relatively small amount of diluted material over a large area. Examples of regulators so used are maleic hydrazide and gibberellic acid. Accidental localization of the effective ingredient can occur, however, resulting in phytotoxicity if the ingredient is herbicidal at higher concentrations. For this reason plant growth regulators with very low phytotoxicity are desirable. Certain known herbicidal compounds are derived from 2,6-dichlorobenzaldehyde, e.g. 2,6-dichlorobenzaldehyde oxime, 2,6 - dichlorobenzaldehyde semicarbazone, N,N-dimethyl-2,6-dichlorobenzaldehydrazone and 2,6-dichlorobenzonitrile, a commercial herbicide. However, it has not, so far as applicants are aware, been observed by others heretofore that sulfonylhydrazone derivations of 2,6-dihalobenzaldehydes are active herbicides. It is believed to be highly surprising and unexpected that the compounds used in the method of the present invention are useful and nontoxic to plants at dosages which produce valuable plant growth regulating effects.

SUMMARY OF THE INVENTION

The invention relates to a hitherto unknown method of use of compounds of the formula

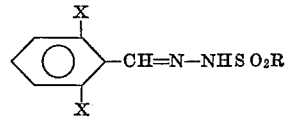

Formula I wherein X is a halogen and R is alkyl or haloalkyl of one to 16 carbon atoms, benzyl, phenyl or substituted phenyl as plant growth regulators.

The compounds which are useful in the method of the invention are those wherein X is halogen, i.e. fluorine, chlorine, bromine or iodine. Both X substituents may be the same halogen, or they may be different. The most readily available and synthetically accessible species of the above generic formula are the 2,6-dichloro compounds, and generally the compounds symmetrical with respect to the X substituents are the more readily available. It is preferred that X be chlorine or bromine, and preferably that one X substituent always be chlorine in the compounds used in the method of the present invention. Nonsymmetrical variations of 2,6-dihalobenzaldehydes are known, and methods for using compounds of Formula I derived from such variations are a part of the present invention.

Compounds used herein wherein R is straight or branched chain alkyl or haloalkyl of one to about 16 carbon atoms have been found to be active as plant growth regulators. Compounds containing up to about six carbon atoms, i.e. lower alkyl or haloalkyl are presently preferred.

Compounds used herein wherein R contains a phenyl ring, i.e. benzyl, substituted benzyl, phenyl or substituted phenyl are active as plant growth regulators. The phenyl ring may be substituted by one to five substituents. However, compounds containing one to three substituents are more readily accessible synthetically, and are presently preferred. These substituents may be the same or different. Substituents which may be present include halogen, lower alkoxy, lower alkyl, lower haloalkyl and lower alkanoylamido. It is presently preferred that when the substituents are alkoxy, alkyl, haloalkyl or alkanoylamido, they contain one or two carbon atoms.

The compounds useful in the method of the invention are prepared by the reaction of a 2,6-dihalobenzaldehyde with an alkylsulfonyl, haloalkylsulfonyl, aralkylsulfonyl or arylsulfonyl hydrazide. Some 2,6-dihalobenzaldehydes are readily available, and some others are reported in the chemical literature. See, for example, G. Lock, Berichte, Vol. 68, page 1505 (1935); J. F. Bunnett et al., J.A.C.S., Vol. 83, page 2512 (1961); and British Pat 1,080,167, issued Aug. 23, 1967. All of the 2,6-dihalobenzaldehydes are available through the use of the synthetic techniques reported for the preparation of such compounds.

Some of the alkyl and aryl sulfonylhydrazides are known in the art, and all of the substituted hydrazides used to prepare the compounds employed in the method of the present invention can be synthesized by known methods, such as reaction of the correspondingly substituted sulfonyl halides with hydrazine. The haloalkylsulfonyl hydrazides disclosed herein as reactants are not reported in the literature, and their synthesis is described hereinafter.

The following reaction scheme describes the preparation of the compounds useful in the method of the invention:

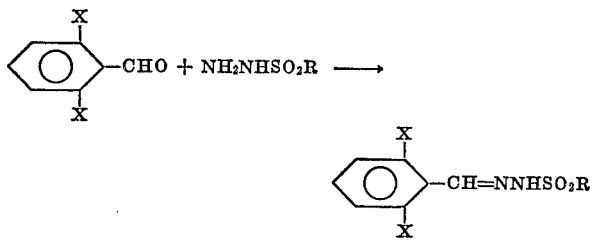

The hydrazide is first reacted with the benzaldehyde. The mixture is then dissolved in refluxing ethanol, and the reaction is heated at reflux temperature (approximately 80° C.) for one to several hours to insure the completion of the reaction. The product generally is obtained as a solid precipitate upon cooling of the reaction mixture.

The method for plant growth regulating activity using the compounds of Formula I was demonstrated by employing them in greenhouse and field on several plant species.

In the greenhouse tests, the plants were sprayed to run-off with a solution of the compounds of the invention in acetone with a surfactant such as "Tronic" (a mixture of alkyl aryl oxyethylene glycols mixed petroleum distillates, alkyl sulfates and alkyl amine acetates). The concentration of the chemical is 500 to 2,000 parts per million (weight per unit volume), and the surfactant concentration is 0.25 to 1.0 percent. The plants were checked daily for any effect on or alteration of the development of the plant compared to untreated controls. The compounds of the invention were found to be active in producing plant growth reguatlory effects. In particular, bean plants (*Phaseolus vulgaris* var. *pinto*) were found to undergo dwarfing of the plant with increased bud and bean production. Dark green coloration of the treated plants were noted. Such regulation was noted after two to three weeks. Such an effect is extremely desirable, suggesting that more plants could be planted in a given area while each plant produces more beans.

When a field test was conducted and growing soybeans were treated with a solution of 500 parts per million of active compound, a significant weight increase in the crop of beans was observed as compared with the crop from an untreated control group of soybean plants.

Compounds of Formula I are also useful in promoting the rooting of cuttings of ornamental and food-producing plants.

Among the most active of the compounds were the following:

2,6-dichlorobenzaldehyde 4-bromobenzenesulfonylhydrazone,
2,6-dichlorobenzaldehyde benzenesulfonylhydrazone,
2,6-dichlorobenzaldehyde 4-methylbenzenesulfonylhydrazone,
2,6-dichlorobenzaldehyde 4-nitrobenzenesulfonylhydrazone,
2,6-dichlorobenzaldehyde 4-methoxybenzenesulfonylhydrazone,
2,6-dichlorobenzaldehyde 4-fluorobenzenesulfonylhydrazone,
2,6-dichlorobenzaldehyde 2,4,5-trichlorobenzenesulfonylhydrazone,
2,6-dichlorobenzaldehyde 3-nitrobenzenesulfonylhydrazone,
2,6-dichlorobenzaldehyde 2-nitrobenzenesulfonylhydrazone,
2,6-dichlorobenzaldehyde 3,4-dichlorobenzenesulfonylhydrazone,
2,6-dichlorobenzaldehyde 2,5-dichlorobenzenesulfonylhydrazone,
2,6-dichlorobenzaldehyde 4-chloro-3-nitrobenzenesulfonylhydrazone,
2,6-dichlorobenzaldehyde 2,3,4-trichlorobenzenesulfonylhydrazone,
2,6-dichlorobenzaldehyde methanesulfonylhydrazone,
2,6-dichlorobenzaldehyde ethanesulfonylhydrazone,
2,6-dichlorobenzaldehyde butanesulfonylhydrazone,
2,6-dichlorobenzaldehyde fluoromethanesulfonylhydrazone,
2,6-dichlorobenzaldehyde chloromethanesulfonylhydrazone and
2,6-dichlorobenzaldehyde phenylmethanesulfonylhydrazone.

In order to modify the growth of plants, the compounds of Formula I can be used alone as plant growth regulators, for example as dusts or granules of the compounds, or preferably they may be applied in formulations containing the active ingredients in a horticulturally acceptable extending medium. The formulations are comprised of one or more active ingredients and one or more adjuvants and/or carriers. Specific formulations are useful to facilitate the application of the compounds and to and to achieve specific biological objectives such as controlling the availability of the compound, improving adherence to plants, and the like, as it is well known to those skilled in the art.

The compounds of Formula I may be formulated as wettable powders, emulsifiers concentrates, aqueous or non-aqueous solutions and/or suspensions, granules, dusts and the like. Said compounds as such can be finely divided and dispersed or suspended in any of the usual aqueous media. Spreading agents, wetting agents, sticking agents or other adjuvants can be added as desired.

When emulsifiable concentrates are prepared, the active ingredient can be present in concentration of about 5 percent to 60 percent or more, depending upon its solubility. The units of concentration are weight per unit weight. The active ingredients are soluble in common organic horticultural solvents such as benzene, toluene, xylene, dichloromethane, chloroform, hexane and heptane or less highly refined aromatic or aliphatic hydrocarbons and mixtures thereof. Examples of these are coal tar fractions, straight run petroleum distillates, thermolytically or catalytically cracked hydrocarbon oil, gas oil, light lubricating oil fractions, kerosenes, mineral seal oil, and the like. In appropriate cases, oxygenated solvents such as ketones may be used in or as the carriers. These concentrations can be dispersed in water to permit the use of an aqueous spray. A mixture with a small amount of an organic surface active agent capable of lowering the surface tension of water is preferred, so as to produce more or less stable emulsions.

Examples of surface active agents variously known as dispersing agents, wetting agents or emulsifying agents comprise soft or hard soaps, morpholine or dimethylamine oleate, sulfonated fish, castor and petroleum oils, sodium salts of lignin sulfonic acid, alkylated aromatic sodium sulfonates such as decylbenzene sodium sulfonate, dodecylbenzene sodium sulfonate, butyl or other amine salts of decyl or dodecylbenzene sulfonic acid, sodium lauryl sulfate, disodium monolauryl phosphate, ethylene oxide condensation products of alkyl phenols, as for example octyl phenol, ethylene oxide condensation products of tall oil and ethylene oxide condensation products of higher alcohols or higher mercaptans. Mixtures of two or more surface active agents are also feasible. Generally, the surface active agent will comprise only a small proportion of the composition, say 0.1 to 15 percent by weight of the toxicant.

The formulation of dry compositions for application as granules, dusts or for further dilution with liquid carriers is readily accomplished by mixing the active ingredient with a solid carrier. Such solid carriers will be of various sizes from dust to granules. The techniques for such formulations are well known to the art. Suitable carriers include charcoal, talc, clay, pyrophyllite, silicas, fuller's earth, lime, diatomaceous earth, flours, such as walnut shell, wheat, soya bean, cottonseed and wood flours, magnesium and calcium carbonate, calcium phosphate and the like. Powders may be granulated by the use of suitable binders such as cellulose derivatives, for example ethyl or carboxymethyl, corn syrup and the like.

When wettable powders are prepared the active ingredients can be present in concentration of about 10 to 75 percent but preferably about 50 percent. The presently preferred carrier is clay, and it is preferred to add a combination of surface active agents such as a sodium alkyl naphthalene sulfonate and a sodium lignosulfonate in an amount about one percent by weight of each ingredient.

The method of the invention is carried out, using compounds of the general Formula I, in compositions adapted for application to the plants to be treated, as those formulations are described herein. The formulations are diluted with water if necessary and are applied by spraying, spreading, dusting or the like. The rate of application will of course vary, but the more active compounds of Formula I exhibit interesting plant growth regulating effects on bean species such as soybeans and pinto beans at the application rate of about 500 to 1,000 parts per million (weight per unit volume). It is of course to be expected that local conditions, for example temperature, humidity, moisture content of the soil, nature of the soil, stage of growth of the plant and the like, may require greater or smaller amounts. Effective resolution of these factors is within the skill of those versed in the art. Likewise it is apparent that not all of the compounds included within the scope of the invention have equal activity.

The plant growth regulating compositions as used in the method of the invention may contain one or more of the compounds set out hereinbefore as the sole active species, or they may contain in addition thereto other biologically active substances. Thus, insecticides and fungicides may be incorporated in the compositions. Further, if desired, the compositions may contain fertilizers, trace metals or the like, and when applied directly to the soil may additionally contain nematicides, soil conditioners, other plant growth regulators and/or herbicides of similar or different properties.

The preparation and properties of compounds of Formula I useful in the method of the present invention are more specifically illustrated by the following examples.

Example 1

To a stirred mixture of 7.3 gm. of 4-bromobenzenesulfonylhydrazide (0.029 mole) in 50 ml. of water is added a solution of 5 gm. of 2,6-dichlorobenzaldehyde (0.0286 mole) in 50 ml. of ethanol in one batch. A solid precipitates, and 500 ml. of ethanol is added. The mixture is heated to reflux and maintained at reflux temperature for one hour. The solution is then filtered hot and allowed to cool slowly. The precipitate is collected by filtration and washed three times with 75 ml. of water. The white solid is 2,6-dichlorobenzaldehyde 4-bromobenzenesulfonylhydrazone, M.P. 181–183° C. The method of the invention is carried out by applying the compound at concentration of 500–1,000 p.p.m. in an inert diluent or carrier, such as water or acetone, preferably with a small amount of wetting agent, to the leaves of growing plants. Thus, when applied once to growing soybeans when substantially fully leafed out, before flowering, an increase in ultimate crop yield is effected.

*Analysis.*—Calculated for $C_{13}H_9BrCl_2N_2O_2S$: C, 38.3; H, 2.2; N, 6.9. Found: C, 38.5; H, 2.1; N, 6.9.

Other 2,6-dihalobenzaldehyde arylsulfonyl hydrazones which are prepared according to the method of Example 1 are given in the following table.

TABLE I

| Example number | Compound | Melting point (° C.) |
|---|---|---|
| 2 | 2,6-dichlorobenzaldehyde benzenesulfonylhydrazone. | 125–130 |
| 3 | 2,6-dichlorobenzaldehyde 4-methylbenzenesulfonylhydrazone. | 189–193 |
| 4 | 2,6-dichlorobenzaldehyde 4-nitrobenzenesulfonylhydrazone. | 193–197 |
| 5 | 2,6-dichlorobenzaldehyde 4-methoxybenzenesulfonylhydrazone. | 145.5–149.5 |
| 6 | 2,6-dichlorobenzaldehyde 4-fluorobenzenesulfonylhydrazone. | 179–181 |
| 7 | 2,6-dichlorobenzaldehyde 2,4,5-trichlorobenzenesulfonylhydrazone. | 206–209 |
| 8 | 2,6-dichlorobenzaldehyde 3-nitrobenzenesulfonylhydrazone. | 162–167 |
| 9 | 2,6-dichlorobenzaldehyde 2-nitrobenzenesulfonylhydrazone. | |
| 10 | 2,6-dichlorobenzaldehyde 3,4-dichlorobenzenesulfonylhydrazone. | 188.5–191 |
| 11 | 2,6-dichlorobenzaldehyde 2,5-dichlorobenzenesulfonylhydrazone. | 203–208 |
| 12 | 2,6-dichlorobenzaldehyde 4-chloro-2-nitrobenzenesulfonylhydrazone. | |
| 13 | 2,6-dichlorobenzaldehyde pentafluorobenzenesulfonylhydrazone. | |
| 14 | 2,6-dichlorobenzaldehyde 4-chloro-3-nitrobenzenesulfonylhydrazone. | 196–197 |
| 15 | 2,6-dichlorobenzaldehyde 2,3,4-trichlorobenzenesulfonylhydrazone. | 157–159 |
| 16 | 2,6-dichlorobenzaldehyde 4-trifluoromethylbenzenesulfonylhydrazone. | |

Example 17

To a stirred solution of 7.7 gm. of methanesulfonylhydrazide (0.07 mole) in 75 ml. of water a solution of 12 gm. of 2,6-dichlorobenzaldehyde (0.069 mole) in 100 ml. of ethanol in one batch. A solid precipitates after which 300 ml. of ethanol are added. The solution is heated to reflux temperature and maintained at reflux for one hour. The mixture is filtered hot and allowed to cool slowly. The precipitate is collected by filtration and washed thoroughly with water. The white solid is 2,6-dichlorobenzaldehyde methanesulfonylhydrazone, M.P. 175–182° C.

*Analysis.*—Calculated for $C_8H_8Cl_2N_2O_2S$: C, 36.0; H, 3.0; N, 10.5. Found: C, 36.0; H, 3.0; N, 10.6.

Other 2,6-dihalobenzaldehyde sulfonylhydrazones which are prepared according to the method of Example 17 are given in the following table.

TABLE II

| Example number | Compound | Melting point (° C.) |
|---|---|---|
| 18 | 2,6-dichlorobenzaldehyde ethanesulfonylhydrazone. | 158–163 |
| 19 | 2,6-dichlorobenzaldehyde n-butanesulfonylhydrazone. | 96–99 |
| 20 | 2,6-dichlorobenzaldehyde fluoromethanesulfonylhydrazone. | 132–135 |
| 21 | 2,6-dichlorobenzaldehyde chloromethanesulfonylhydrazone. | 127–128 |
| 22 | 2,6-dichlorobenzaldehyde phenylmethanesulfonylhydrazone. | 178–183 |
| 23 | 2,6-dichlorobenzaldehyde n-hexadecanesulfonylhydrazone. | 97–101 |
| 24 | 2-chloro-6-fluorobenzaldehyde methanesulfonyl- | 131–136 |

Other hydrazones of Formula I prepared according to the synthetic procedures described specifically in Examples 1 and 17 are useful in the plant growth regulating method of the invention are exemplified, with intermediates which are used for their preparation, in the following table.

TABLE III

| Ex. No. | Intermediates Aldehyde | Sulfonyl halide | Final products of Formula I |
|---|---|---|---|
| 25 | 2,6-diiodobenz-aldehyde. | Methanesulfonyl chloride. | 2,6-diiodobenzaldehyde methanesulfonylhydrazone. |
| 26 | 2-bromo-6-chlorobenzaldehyde. | ....do............ | 2-bromo-6-chlorobenzaldehyde methanesulfonylhydrazone. |
| 27 | 2,6-dibromobenz-aldehyde. | 4-bromobenzenesulfonyl chloride. | 2,6-dibromobenzaldehyde-4-bromobenzenesulfonylhydrazone. |
| 28 | 2,6-dichlorobenz-aldehyde. | 4-chlorosulfonyl acetanilide. | 2,6-dichlorobenzaldehyde-4-acetamidophenylsulfonyl hydrazone. |

The synthesis of the novel haloalkylsulfonyl hydrazides is illustrated by the following examples.

Example 29

Hydrazine (13.9 g. of 97 percent, 0.42 mole) is added slowly dropwise, with cooling and stirring, to water (7.2 g., 0.40 mole). The solution is cooled to 10–15° C., and a solution of fluoromethanesulfonyl chloride (26.5 g., 0.20 mole) in tetrahydrofuran (300 ml.) cooled to 5–10° C. is added dropwise with stirring, while maintaining the temperature at 10–15° C. Stirring is continued for fifteen minutes after completion of the addition, the mixture is filtered, and the filtrate is washed twice with 70 ml. of saturated sodium chloride solution. The washed filtrate is dried over anhydrous magnesium sulfate, filtered, and petroleum ether (300 ml.) is added. The mixture is cooled for 72 hours, and the product, an oily solid, is separated and dried in vacuo to remove solvent. The infrared spectrum of the product is consistent with the assigned structure, monofluoromethanesulfonylhydrazide.

Example 30

Using the method of Example 29, chloromethanesulfonyl chloride is reacted with hydrazine to provide monochloromethanesulfonylhydrazide, m.p. 73–76° C. The infrared spectrum of the product is consistent with the assigned structure.

What is claimed is:

1. Method of affecting the growth of plants to bring about dwarfism comprising growing plants with an effective amount of a composition containing up to 2,000 parts per million of a compound of the formula

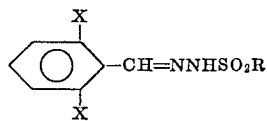

wherein X is halogen and R is alkyl or haloalkyl of one to 16 carbon atoms, benzyl, phenyl or substituted phenyl radicals of the formula

wherein Y is halogen, lower alkyl, lower alkoxy, nitro or lower alkanoylamido, and $n$ is zero to five.

2. Method according to claim 1 wherein R is lower alkyl.
3. Method according to claim 1 wherein R is lower haloalkyl.
4. Method according to claim 1 wherein X is chlorine and R is lower chloroalkyl.
5. Method according to claim 1 wherein $n$ is zero to three.
6. Method according to claim 5 wherein Y is methyl, methoxy, halogen, nitro or acetamido.
7. Method according to claim 1 wherein the treatment is applied to soybeans.

References Cited

UNITED STATES PATENTS

| 3,527,594 | 9/1970 | Brepoles et al. | 71—76 X |
| 3,455,983 | 7/1969 | Nikles et al. | 71—103 X |

OTHER REFERENCES

Munshi et al.: Chem. Abst., vol. 59 (1963), 12684d.

LEWIS GOTTS, Primary Examiner

C. L. MILLS, Assistant Examiner

U.S. Cl. X.R.

71—103

UNITED STATES PATENT OFFICE
CERTIFICATE OF CORRECTION

Patent No. 3,817,740     Dated June 18, 1974

Inventor(s) Tomas L. Fridinger, Edward L. Mutsch & David R. Pauly

It is certified that error appears in the above-identified patent and that said Letters Patent are hereby corrected as shown below:

Column 4, line 41, for "emulsifiers" read --emulsifiable--.

Column 6, Table II, after the last printed line of the table add --hydrazone--.

Column 7, in claim 1, second line, between "comprising" and "growing" insert --treating--.

Signed and sealed this 29th day of October 1974.

(SEAL)
Attest:

McCOY M. GIBSON JR.
Attesting Officer

C. MARSHALL DANN
Commissioner of Patents